(12) United States Patent
Pan et al.

(10) Patent No.: US 7,978,931 B2
(45) Date of Patent: Jul. 12, 2011

(54) OPTIMIZED VIDEO STITCHING METHOD

(75) Inventors: Patrick Pan, Taipei (TW); Tatsumi Mitsushita, Taipei (TW); Christine Lin, Taipei (TW); Benjamin Kuo, Taipei (TW)

(73) Assignee: Sony Corporation, Tokyo (JP)

( * ) Notice: Subject to any disclaimer, the term of this patent is extended or adjusted under 35 U.S.C. 154(b) by 1097 days.

(21) Appl. No.: 11/715,929

(22) Filed: Mar. 9, 2007

(65) Prior Publication Data
US 2007/0211934 A1    Sep. 13, 2007

(30) Foreign Application Priority Data
Mar. 10, 2006   (TW) ................................ 95108285 A

(51) Int. Cl.
*G06K 9/00* (2006.01)
*G06K 9/36* (2006.01)

(52) U.S. Cl. ...................................... 382/284; 382/154

(58) Field of Classification Search ................. 382/284, 382/154; 345/419–427, 629–641; 356/12; 348/584–601
See application file for complete search history.

(56) References Cited

U.S. PATENT DOCUMENTS

| | | | | |
|---|---|---|---|---|
| 4,727,365 | A * | 2/1988 | Bunker et al. | 345/427 |
| 6,369,818 | B1 * | 4/2002 | Hoffman et al. | 345/427 |
| 6,974,964 | B1 * | 12/2005 | Wang | 250/559.29 |
| 7,123,777 | B2 * | 10/2006 | Rondinelli et al. | 382/284 |
| 7,400,782 | B2 * | 7/2008 | Zhou et al. | 382/284 |
| 2002/0154812 | A1 * | 10/2002 | Chen et al. | 382/154 |
| 2003/0235344 | A1 | 12/2003 | Kang et al. | |
| 2005/0001852 | A1 * | 1/2005 | Dengler et al. | 345/633 |

* cited by examiner

*Primary Examiner* — Vikkram Bali
*Assistant Examiner* — Michelle Entezari
(74) *Attorney, Agent, or Firm* — Finnegan, Henderson, Farabow, Garrett & Dunner, L.L.P.

(57) ABSTRACT

The invention discloses an optimized video stitching method, comprising: inputting predefined pattern images; proceeding with a transformation which combines planar and cylindrical transformation; proceeding with a merging calculation which combines linear difference merging and alpha blending calculation; and proceeding with a horizontal stitching processing by putting the processed images horizontally together into one seamless wide-angle image. The optimized video stitching method according to the invention further comprises a camera position calibration flow comprising: finding a planar matrix by using predefined pattern images; proceeding with a planar transformation of image; proceeding with an image registration by using a block matching method to find out the stitching points on the planar surface; and proceeding with a cylindrical transformation by transforming the stitching points from the planar surface to cylindrical surface.

8 Claims, 6 Drawing Sheets

The optimized video stitching method of the invention

A conventional stitching method

The optimized video stitching method of the invention

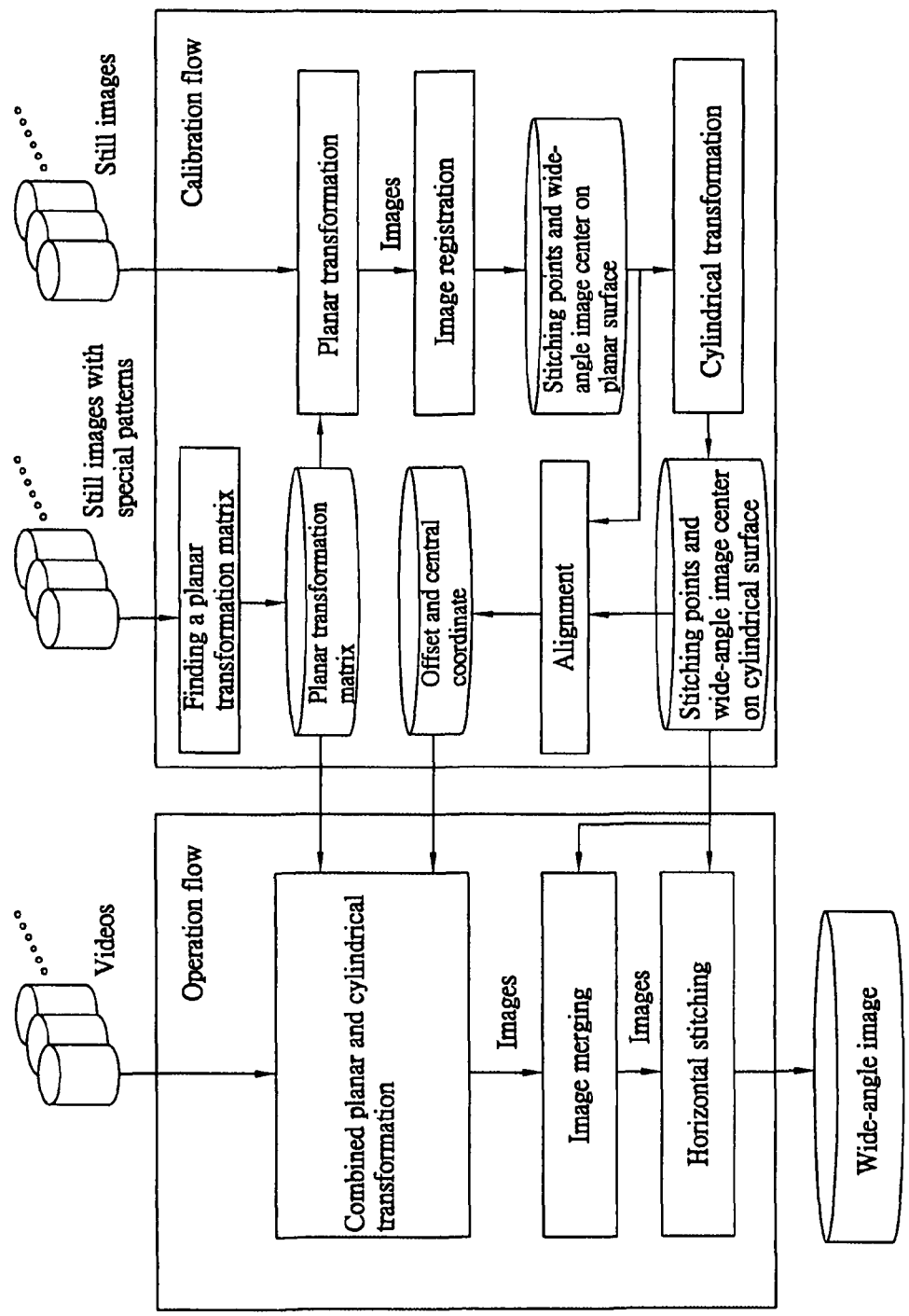
Fig. 3 The relationship between the optimized video stitching method and the camera position calibration flow according to the invention

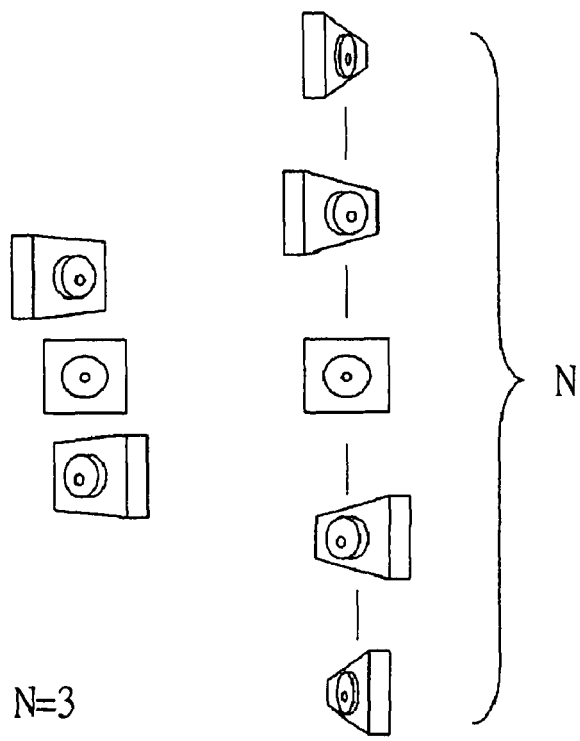
Fig. 4 Multi-eye camera module
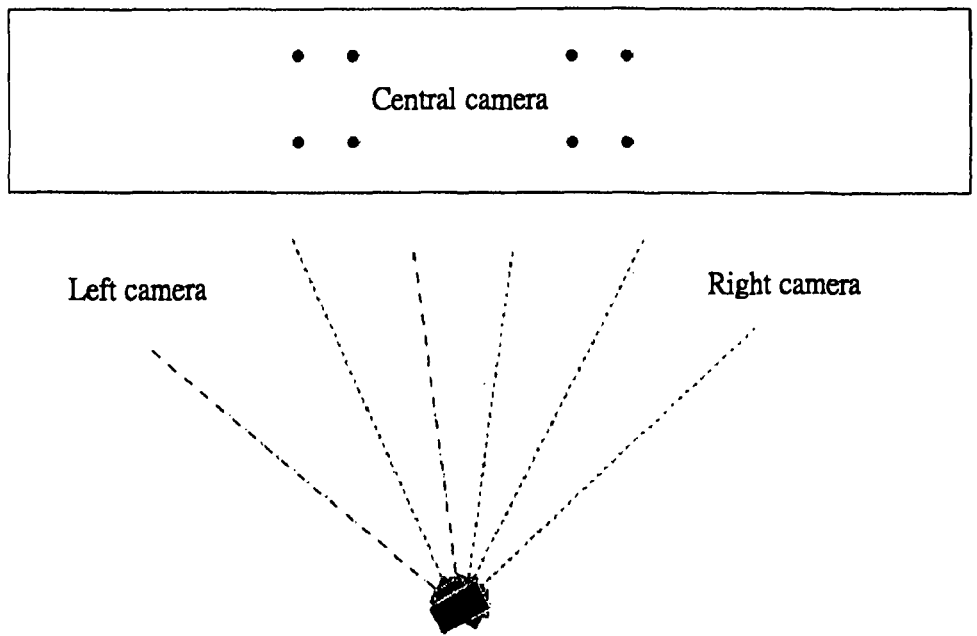
Fig. 5 A predefined pattern for finding a planar transformation matrix

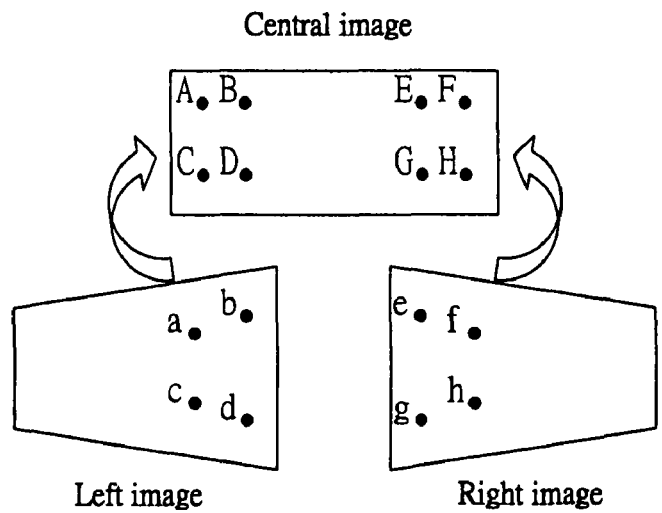
Fig. 6  Predefined patterns captured by a multi-eye camera module of N=3
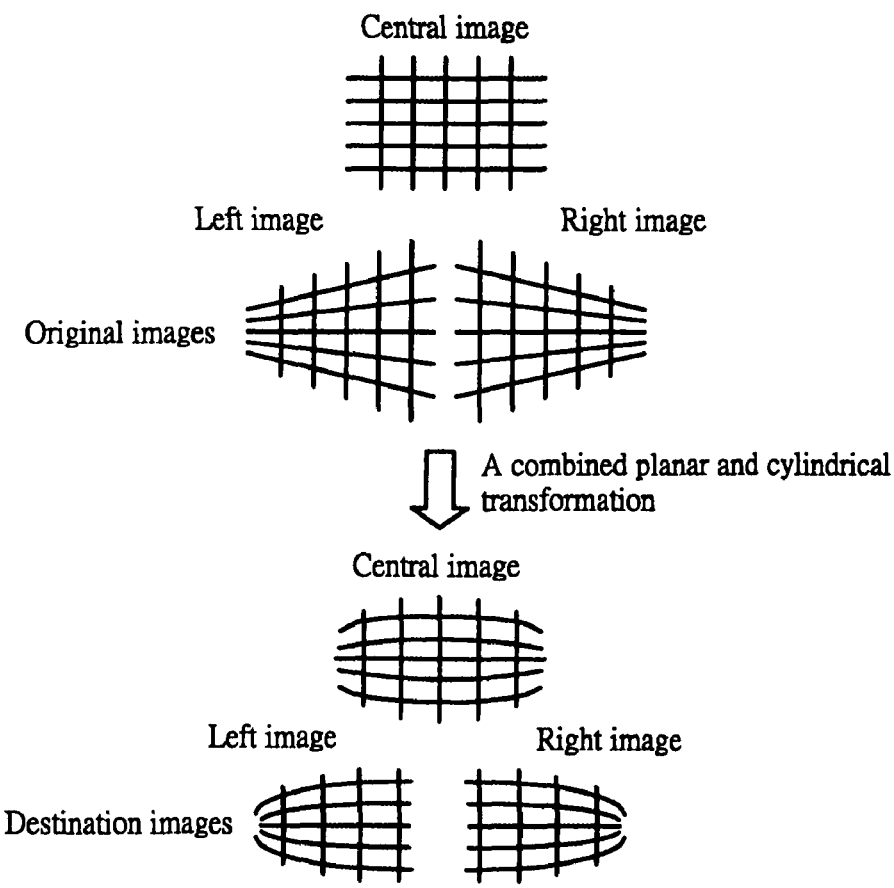
Fig. 7  Combined planar and cylindrical transformtion

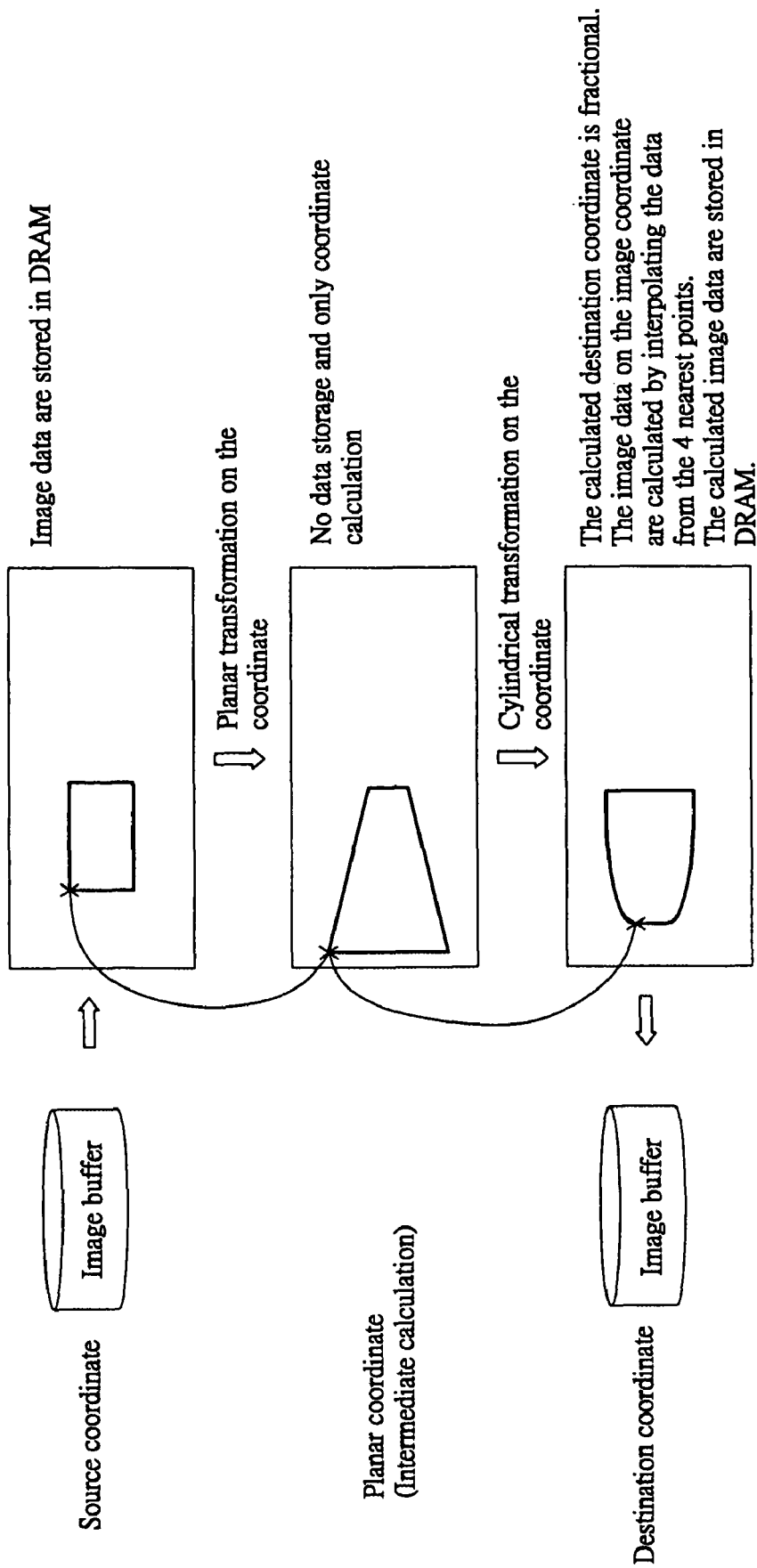
Fig. 8 The forward transformation sequences of left image

OPTIMIZED VIDEO STITCHING METHOD

BACKGROUND OF THE INVENTION

1. Field of the Invention

The invention relates to an optimized video stitching method, more especially to an optimized video stitching method for high resolution/high frame rate video.

2. Description of the Prior Art

A conventional stitching method, as described in the United States Patent US 20030235344A1, is shown in FIG. 1. As shown in FIG. 1, firstly, all the input images are transformed to a planar surface. Secondly, the stitching points are calculated with the image registration algorithm. Thirdly, the overlap regions of the images are merged to smooth out the differences near the stitching points and then stitched into one seamless wide-angle image. Finally, the seamless wide-angle image is transformed to a cylindrical surface. As far as the implementation in the hardware engine is concerned, the whole frame of video data needs to be stored in the DRAM on a separate chip from the stitching engine. In the conventional stitching method, both of the video frame data on the planar and cylindrical surfaces need to be stored and the image registration needs to access the planar frame data recursively to find the matched blocks in the image overlap regions. Therefore, the bandwidth requirement of external memory access for video stitching is very large and is not feasible with the above-mentioned method at a reasonable fps (frame per second). Apart from this, the computation requirement for image registration puts limitation to achieve reasonable frame rate.

SUMMARY OF THE INVENTION

According to one aspect of the invention, there is provided an optimized video stitching method, comprising: inputting predefined pattern images; proceeding with a transformation which combines planar and cylindrical transformation; proceeding with a merging calculation which combines linear difference merging and alpha blending calculation; and proceeding with a horizontal stitching processing by putting the processed images horizontally together into one seamless wide-angle image.

According to another aspect of the invention, the predefined pattern images are captured by a multi-eye camera module, wherein the non-parallax points between each camera of the multi-eye camera module are aligned in a vertical direction. For stitching in horizontal direction, the alignment of the camera non-parallax points avoids the parallax problem so that the stitching points for the objects at different distance remains constant. Therefore, the operation flow of the invention can use fixed stitching points calculated from the calibration flow. There is no need to update the stitching points for each frame. Similarly, if the non-parallax points between each camera of the multi-eye camera module are aligned in a horizontal direction, the invention can be applied for stitching in a vertical direction.

According to the other aspect of the invention, there is provided a camera position calibration flow comprising: finding a planar matrix by using predefined pattern images; proceeding with a planar transformation of image; proceeding with an image registration by using a block matching method to find out the stitching points on the planar surface; and proceeding with a cylindrical transformation by transforming the stitching points from the planar surface to cylindrical surface to find out the coordinate offsets and the wide-angle image centers required for the combined planar and cylindrical transformation. The planar matrix required for the planar transformation are calculated from the predefined pattern images to find out the planar transformation matrices according to the camera position. The still images which have enough features in the overlap regions are transformed to the plane of the center image with the planar matrixes calculated from the planar matrix finding. The image registration uses block matching algorithm to find the stitching points on the planar surface. According to the planar image size and the stitching points, the wide-angle image center can be calculated. The stitching points and the planar wide-angle image center are further transformed to the cylindrical surface. The alignment block uses the stitching points on both the planar and cylindrical surfaces, together with the centers of the planar and cylindrical wide-angle images to calculate the offsets to align images in the combined planar and cylindrical transformation block.

In the optimized video stitching method of the invention, the combined planar and cylindrical transformation does interpolation only once. In a conventional stitching method, the interpolation is calculated twice. Therefore, the wide-angle image obtained by the invention is more precise. Only the captured video and data on the cylindrical surface are required to be stored in the DRAM. Image registration is not calculated for each frame of video data but is only processed once with the still image data during calibration. In the invention, the DRAM memory size and the access bandwidth requirement are both reduced. The method of the invention optimizes for substantial reduction in computation and the external memory access for video data. It makes the realization of the hardware video stitching engine feasible. Further, the image quality is improved compared to the conventional method because interpolation is performed only once rather than twice as compared to the conventional method.

BRIEF DESCRIPTION OF THE DRAWINGS

FIG. 3 is a drawing which shows the relationship between the optimized video stitching method and the camera position calibration flow according to the invention.

FIG. 4 is a drawing which shows the arrangement of cameras of multi-eye camera module of N=3 and N=5.

FIG. 5 is a drawing which shows cameras of multi-eye camera module of N=3 are used to take photographs of a predefined pattern image with four black points.

FIG. 6 is a drawing which shows the left-side image, central image and right-side image obtained by cameras of multi-eye camera module of N=3 shown in FIG. 5.

FIG. 7 is a drawing which shows the original left-side image, central image and right-side image are proceeded with a combined planar and cylindrical transformation.

FIG. 8 is a drawing which shows the forward transformation sequences of a combined planar and cylindrical transformation (left image).

DETAILED DESCRIPTION OF THE INVENTION

Figure 1:
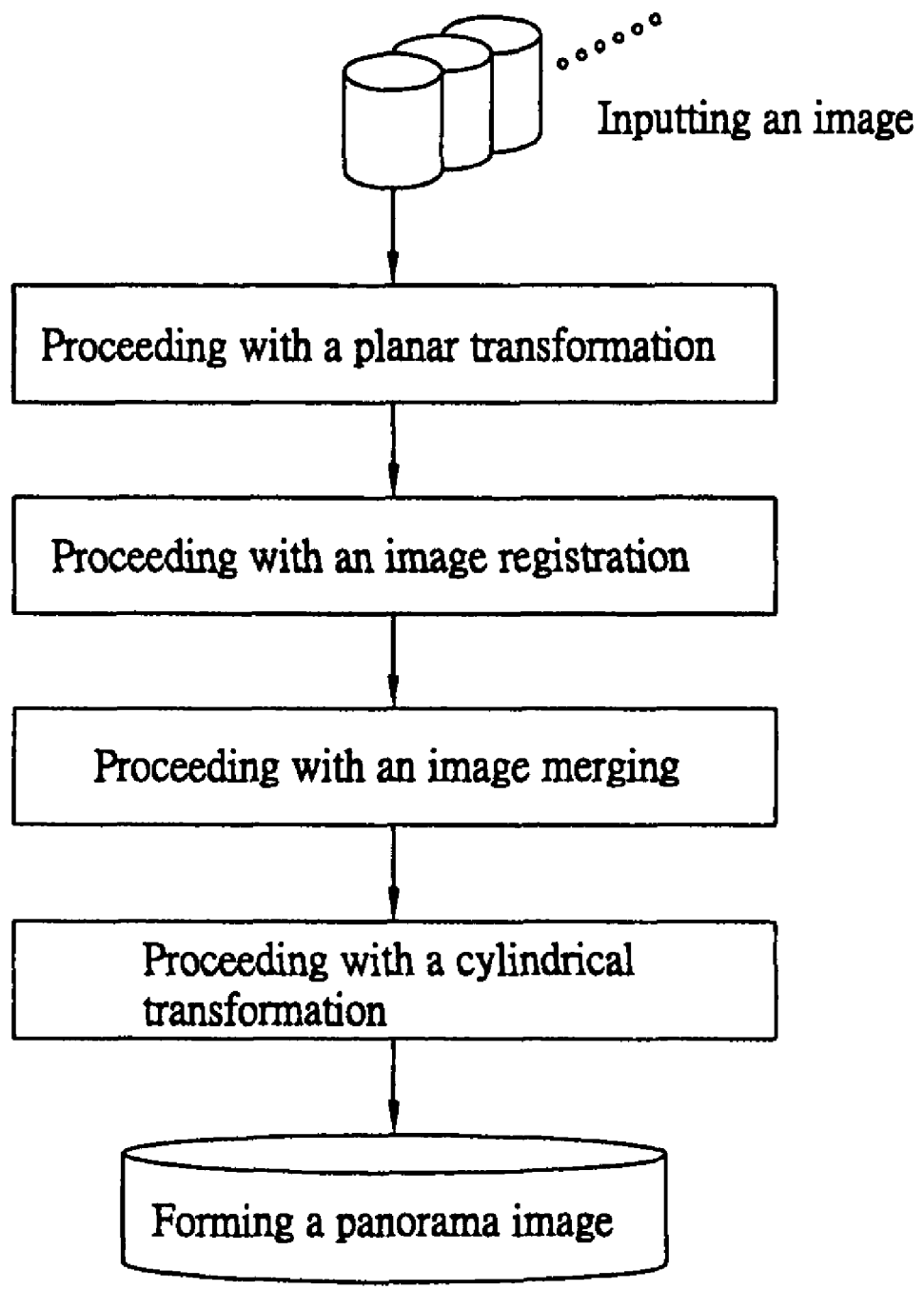
FIG. 1 is a drawing which shows the flow chart of a conventional stitching method.
Figure 2:
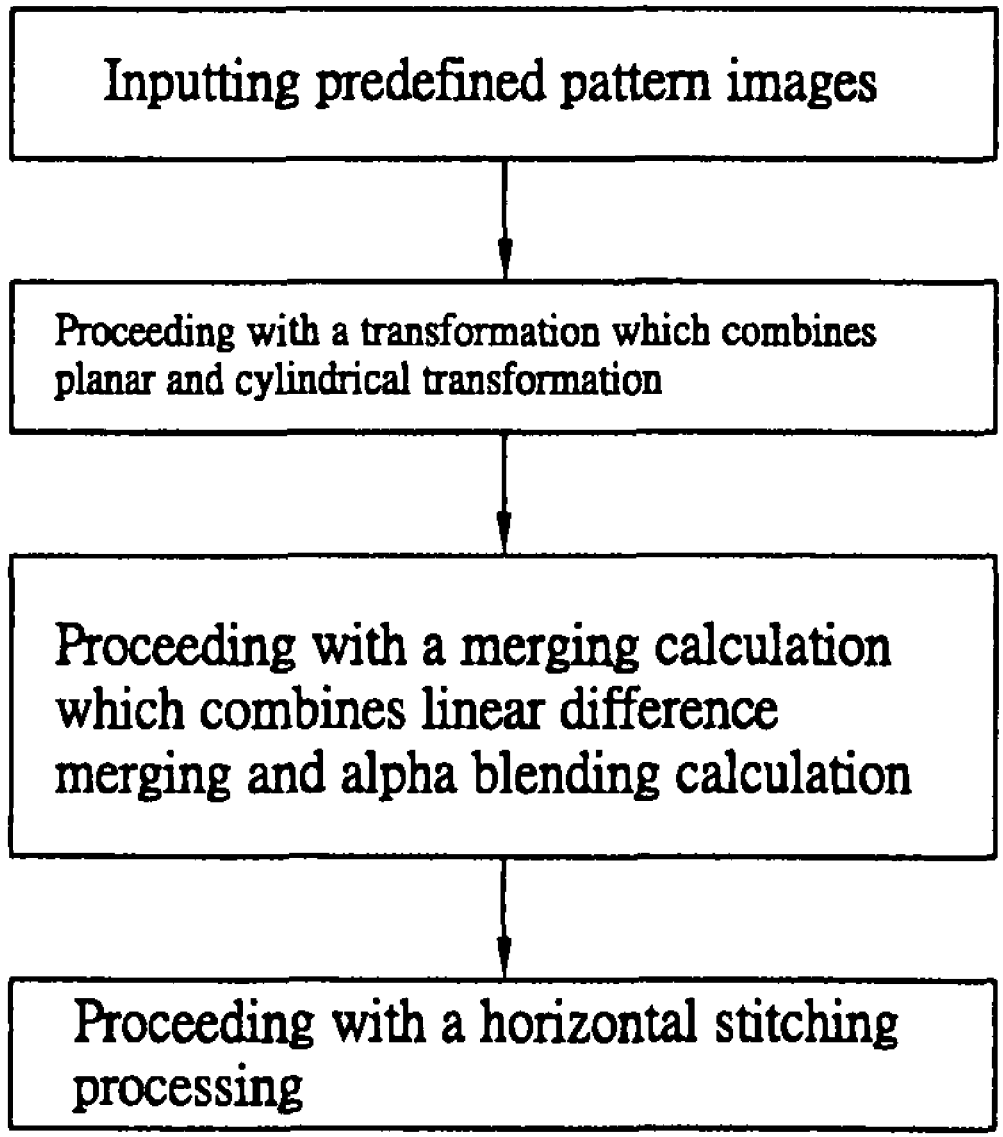
FIG. 2 is a drawing which shows the flow chart of the optimized video stitching method according to the invention.

Referring to FIG. 2, the optimized video stitching method of the invention is explained. The optimized video stitching method of the invention comprises: inputting predefined pattern images; proceeding with a transformation which combines planar and cylindrical transformation; proceeding with a merging calculation which combines linear difference merging and alpha blending calculation; and proceeding with a horizontal stitching processing by putting the processed images horizontally together into one seamless wide-angle image.

In the optimized video stitching method of the invention, when a combined planar and cylindrical transformation, an image merging calculation and a horizontal stitching process are executed, a camera position calibration flow is necessary for obtaining relevant parameters. The camera position calibration flow comprises: finding a planar matrix by using predefined pattern images; proceeding with a planar transformation of image; proceeding with an image registration by using a block matching method to find out the stitching points on the planar surface; and proceeding with a cylindrical transformation by transforming the stitching points from the planar surface to cylindrical surface to find out the coordinate offsets and the wide-angle image centers required for the combined planar and cylindrical transformation.

In FIG. 3, the relationship between the optimized video stitching method and the camera position calibration flow according to the invention is shown. As shown in FIG. 3, a planar matrix is calculated by using predefined pattern images. Image registration uses block matching algorithm to find the stitching points on the planar surface. According to the planar image size and the stitching points, the wide-angle image center can be calculated. The stitching points and the planar wide-angle image center are further transformed to the cylindrical surface, where the cylindrical stitching points are used for image merging/blending and horizontal stitching.

In the optimized video stitching method of the invention, a multi-eye camera module is used for taking photographs of an image. Referring to FIG. 4, the arrangement of cameras of multi-eye camera module of N=3 and N=5 is shown. In the embodiment of the invention, there is described an example of multi-eye camera module of N=3. As shown in FIG. 5, cameras of multi-eye camera module of N=3 are used to take photographs of a predefined pattern image with four black points. FIG. 6 shows the left-side image, central image and right-side image obtained by cameras of multi-eye camera module of N=3 shown in FIG. 5. A planar transformation matrix is calculated according to the coordinates of black points shown in FIG. 6.

A pattern with a plurality of horizontal and vertical lines is used here as an example for explanation. The original left-side image, central image and right-side image of a pattern shown in FIG. 7 are obtained by using cameras of multi-eye camera module of N=3. As shown in FIG. 7, the original left-side image, central image and right-side image are proceeded with a combined planar and cylindrical transformation to obtain destination images. The destination images are processed with combined linear difference merging and alpha blending to smooth out the differences near the stitching points. Then, stitching is performed on the processed image to create one seamless wide-angle image. By the way, in the multi-eye camera module used in the invention, the non-parallax points between each camera of the multi-eye camera module are aligned in a vertical direction. Therefore, for stitching in horizontal direction, the alignment of the camera non-parallax points avoids the parallax problem.

Referring to FIG. 8, the forward transformation sequences of a combined planar and cylindrical transformation are explained. Firstly, the original coordinates of an image are extracted from an image buffer. The original coordinates are transformed to planar coordinates. Thereafter, the planar coordinates are transformed to cylindrical coordinates. The transformed coordinates on the cylindrical surface are fractional. To handle the fractional cylindrical coordinates, the bi-linear interpolation is performed on the coordinates of the source image to calculate the image data on the destination coordinate.

In the optimized video stitching method of the invention, the combined planar and cylindrical transformation does interpolation only once. In a conventional stitching method, the interpolation is calculated twice. Therefore, the wide-angle image obtained by the invention is more precise. Only the captured video and data on the cylindrical surface are required to be stored in the DRAM. Image registration is not calculated for each frame of video data but is only processed once with the still image data during calibration. In the invention, the DRAM memory size and the access bandwidth requirement are both reduced. The method of the invention optimizes for substantial reduction in computation and the external memory access for video data. It makes the realization of the hardware video stitching engine feasible. Further, the image quality is improved compared to the conventional method because interpolation is performed only once rather than twice as compared to the conventional method.

Additional advantages and modifications will readily occur to those skilled in the art. Therefore, the invention in its broader aspects is not limited to the specific details and representative embodiments shown and described therein. Accordingly, various modifications may be made without departing from the spirit or scope of the general inventive concept as defined by the appended claims and their equivalents.

What is claimed is:

1. An optimized video stitching method, comprising:
    inputting predefined pattern images;
    proceeding with a transformation which combines planar and cylindrical transformation, wherein bi-linear interpolation is performed on coordinates of a source image to calculate image data on destination coordinates to handle fractional cylindrical coordinates from the cylindrical transformation;
    proceeding with a merging calculation which combines linear difference merging and alpha blending calculation; and
    proceeding with a horizontal stitching processing by putting the processed images horizontally together into one seamless wide-angle image.

2. The optimized video stitching method according to claim 1, further comprising a camera position calibration flow which comprises:
    finding a planar matrix by using predefined pattern images;
    proceeding with a planar transformation of the source image;
    proceeding with an image registration by using a block matching method to find out the stitching points on the planar surface; and
    proceeding with the cylindrical transformation by transforming the stitching points from the planar surface to cylindrical surface to find out the coordinate offsets and the wide-angle image centers required for the combined planar and cylindrical transformation.

3. The optimized video stitching method according to claim 2, wherein said predefined pattern images are captured by a multi-eye camera module, and the non-parallax points between each camera of said multi-eye camera module are aligned in a vertical direction.

4. The optimized video stitching method according to claim 2, wherein said planar and cylindrical transformation is calculated by applying the interpolation once.

5. A non-transitory computer-readable medium storing a set of instructions that, when executed by a processor, perform an optimized video stitching method, comprising:

inputting predefined pattern images;

proceeding with a transformation that combines planar and cylindrical transformation, wherein bi-linear interpolation is performed on coordinates of a source image to calculate image data on destination coordinates to handle fractional cylindrical coordinates from the cylindrical transformation;

proceeding with a merging calculation that combines linear difference merging and alpha blending calculation; and proceeding with a horizontal stitching processing by putting the processed images horizontally together into one seamless wide-angle image.

6. The computer-readable medium according to claim 5 wherein the optimized video stitching method further comprises generating a camera position calibration flow which comprises:

finding a planar matrix by using predefined pattern images;

proceeding with a planar transformation of the source image;

proceeding with an image registration by using a block matching method to find out the stitching points on the planar surface; and proceeding with the cylindrical transformation by transforming the stitching points from the planar surface to cylindrical surface to find out the coordinate offsets and the wide-angle image centers required for the combined planar and cylindrical transformation.

7. The computer-readable medium according to claim 5, wherein said predefined pattern images are captured by a multi-eye camera module, and the non-parallax points between each camera of said multi-eye camera module are aligned in a vertical direction.

8. The computer-readable medium according to claim 5, wherein said planar and cylindrical transformation is calculated by applying the interpolation once.

* * * * *